United States Patent [19]

Torrani

[11] 4,168,406
[45] Sep. 18, 1979

[54] AUTOMATIC ORBITAL WELDER

[75] Inventor: Roberto Torrani, Brent, Switzerland

[73] Assignee: Allgemeine Patentverwertungs Anstalt, Triesen, Liechtenstein

[21] Appl. No.: 798,341

[22] Filed: May 19, 1977

[30] Foreign Application Priority Data

May 25, 1976 [CH] Switzerland ............ 6596/76

[51] Int. Cl.² ............................................. B23K 9/02
[52] U.S. Cl. .............................. 219/60 A; 219/125.12; 219/130.5; 219/137.41
[58] Field of Search ............. 219/60 A, 130.5, 137.41, 219/125.12

[56] References Cited

U.S. PATENT DOCUMENTS

| | | | |
|---|---|---|---|
| 3,267,251 | 8/1966 | Anderson | 219/125.1 |
| 3,299,245 | 1/1967 | Tinnes | 219/60 A |
| 3,461,265 | 8/1969 | Spiro | 219/60 A |
| 3,555,239 | 1/1971 | Kerth | 219/130.5 |
| 3,715,560 | 2/1973 | Emmerson | 219/108 X |
| 3,737,614 | 6/1973 | Paulange | 219/60 A |
| 3,805,011 | 4/1974 | Knaefel | 219/161 X |
| 4,038,509 | 7/1977 | Henderson | 219/60 A |

FOREIGN PATENT DOCUMENTS

519304 7/1976 U.S.S.R. ................ 219/60 A

*Primary Examiner*—E. A. Goldberg
*Attorney, Agent, or Firm*—Trexler, Wolters, Bushnell & Fosse, Ltd.

[57] ABSTRACT

A machine for automatic weld of abutting pipes or accessories for ducts, or generally of circular solids, by the TIG or PLASMA process, with or without weld metal, comprising a control unit for programming the weld parameters according to cycles suitable to the different types of welds, and a stationary body which can be tightened on the pipes to be welded, supporting a welding torch capable of performing a multiplicity of revolutions about the pieces to be welded, comprising means for tightening said machine on the ends of the pipes to be welded, comprising an element fixed to the body of the machine, and an element movable with respect to the stationary element; means for positioning the welding torch with respect to the ends of the pipes to be welded; means for rotating in a controlled way said torch with respect to the ends of the pipes to be welded, so as to render possible to change several times, even during the same revolution, besides between one revolution and the next one, the welding parameters (speed, current, distances and so on) according to a cycle which can be programmed; means for imparting a to and fro movement to said torch perpendicularly to the weld bead; means for controlling and adjusting the distance between said torch and the pipes to be welded; means for transferring fluids from the stationary part to the rotating part of said torch; means for supplying electric power from said stationary part to said torch; means for feeding weld metal in correspondence with the welding zone.

7 Claims, 15 Drawing Figures

AUTOMATIC ORBITAL WELDER

The present invention relates to a yoke for carrying out entirely automatically the butt welding of pipes.

The TIG electrical welding process is known, whereby a torch with a tungsten electrode moves along the edges to be welded at a pre-fixed and constant distance, so that the electric arc hereby primed in inert gas atmosphere, between the electrode and the piece, will cause the melting of the material, also the PLASMA welding is known where the melting is mainly caused by a jet of high temperature gas, ionized by an electric arc.

In most cases it is further necessary to supply weld material for forming a melted bath filling the calking and cooling so as to ensure good mechanical and metallurgic features to the weld bead.

Particular contrivances must be adopted to furnish an absolute constancy of the welding current intensity according to a programmed cycle, a constant length of the arc, a movement of the torch such as to ensure a good melting of the edges and a regular filling of the calking, a programmed supply of filling material, a protecting inert gas free from impurities and humidity, and to ensure also an effective removal of heat from the torch by circulation of a cooling fluid.

A normal welding cycle generally consists of several stages in which various operations can be carried out, for instance pre-heating, welding of the root, filling with weld material, annealing of the welding bead, etc.

Each of these operations must be made through a little more than a complete turn, in order to ensure an adequate overlapping; however, it must be considered that as the welding operation is made in different positions of the torch with respect to the piece (namely over, under, moving upwards or downwards) during a same operation, it may be necessary to change certain parameters, such as the intensity of the current, the revolution speed of the torch, the amount of weld material, and so on.

Furthermore, in order to have the melted bath homogeneous and well distributed within the calking in order to avoid "stuck welds" to be formed, namely the lack of fusion of the edges, it is necessary that the torch will have a to-and-fro-movement namely a movement crosswise to the feeding direction.

Figure 1:
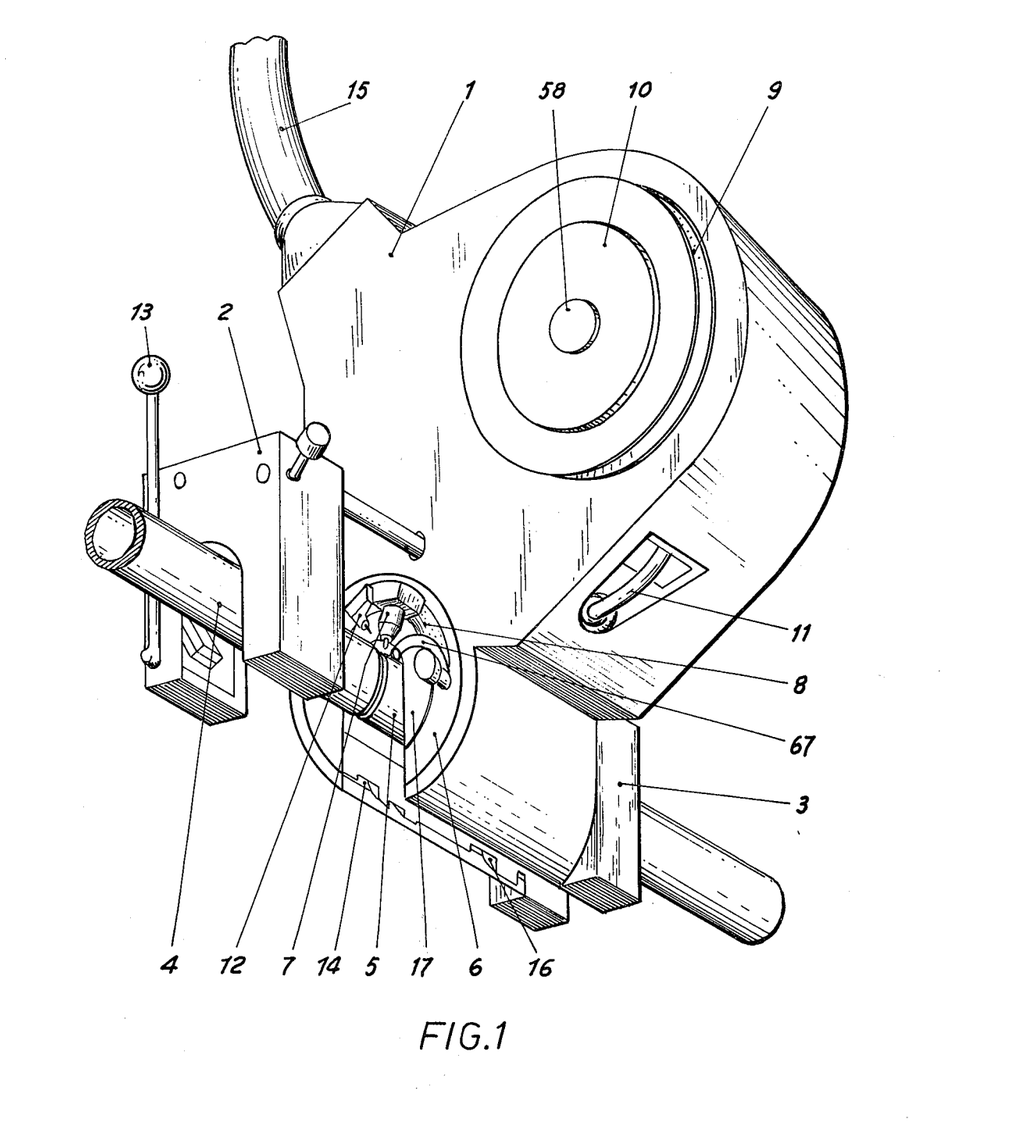
FIG. 1 shows a view of the entire welding yoke, shown straddling two pipes to be welded in abutting position.

The operation of the yoke for automatic welding, according to the present invention and the details of which will be disclosed hereinafter, is as follows: the yoke body will be positioned straddling the two lengths of pipe to be welded, as shown in FIG. 1, and fastened thereto by two quick tightening self-centering vises; thus the two parts of pipe will be kept aligned with one another and centered with respect to the rotational movement of the TIG or PLASMA welding torch.

This torch supported on a rotating body open like a horse shoe in order to allow in its start position, the insertion on the pipes, will start, under operator's control, its first revolution about the pipe carrying out the operation as previously programmed.

At the end of the revolution, covering a little more than one complete turn, in order to ensure the overlapping of the starting point, the torch comes back, moving rearwards in a prefixed time, in order to allow the pieces to cool down to the "interpass" temperature, up to the exact start position, wherefrom a next operation will be started.

The programming of the sequence of operations, of the welding parameters, of the number of revolutions and so on, will be made by a control unit, separate from the yoke, but being an integrating part of the machine.

Further it is provided that during each revolution it will be possible to chance automatically the welding parameters and to impart a to-and-from movement cross-wise with respect to the feeding direction, all according to a pre-selected program.

The present invention will be now described with reference to one embodiment at present preferred, by way of non limitative example and with reference to the attached drawings wherein.

In the present invention, in order to obtain high quality welds, the aforesaid requirements are satisfied by:

1. A ball rolling joint suitable to transmit between one stationary part and a rotating part, currents having high intensities and voltages with no appreciable contact resistance (group I) (FIG. 2). 2. A joint suitable to transmit fluids from one stationary part to a rotating part, with such sealing and safety elements as to avoid the mixing of fluids (particularly the inlet of the cooling fluid into the duct of the protecting inert gas) also in case of wear or incidental break of a seal element (group II) (FIG. 2). 3. A device allowing the position of the torch to be precisely obtained on the weld line after the yoke has been fixed to the pipes to be welded. The same device operates the to-and-fro movement of the torch, namely the displacement from one edge to the other of the weld zone, with amplitudes and times which can be adjusted, also in non symmetrical mode with respect to its central position in order to comply with the needs in case of different materials or thicknesses (group II) (FIG. 2). 4. A device for keeping constant and adjustable at each position the distance between the torch and the pipe to be welded by adopting an either mechanic or electronic feeler which through a control appropriate to the used feeler, corrects the possible variations due to errors of shape of the pipe (group IV) (FIG. 2). 5. A device for precisely detecting, by means of a precision potentiometer, the position and the speed of the torch, allowing the repeated intervention in the course of a single revolution, in order to change the welding parameters (group V) (FIG. 2). 6. A device for supplying the weld metal ensuring the precision in relation to the need of the material fed to the melted bath according to a programmed cycle (group VI) (FIG. 3). 7. A quick tightening self centering vise capable of being adjusted for different diameters of the pipes to be welded.

FIG. 1 shows a perspective view of the yoke in its welding position. The yoke consists of a stationary casing 1 which will be clamped by quick tightening self centering vises 2 and 3, operated by the lever 13, to the two pieces 4 and 5 of pipe to be welded. One body 6 having the shape of a horse shoe in order to allow the yoke to be introduced on, or extracted from, the pipes, rotates about the pipe, supporting the welding torch 7 by means of an arm 8 which operated by a feeler 67 (shown in FIGS. 2 and 7) holds the torch at the suitable distance from the pipe to be welded.

Figure 3:
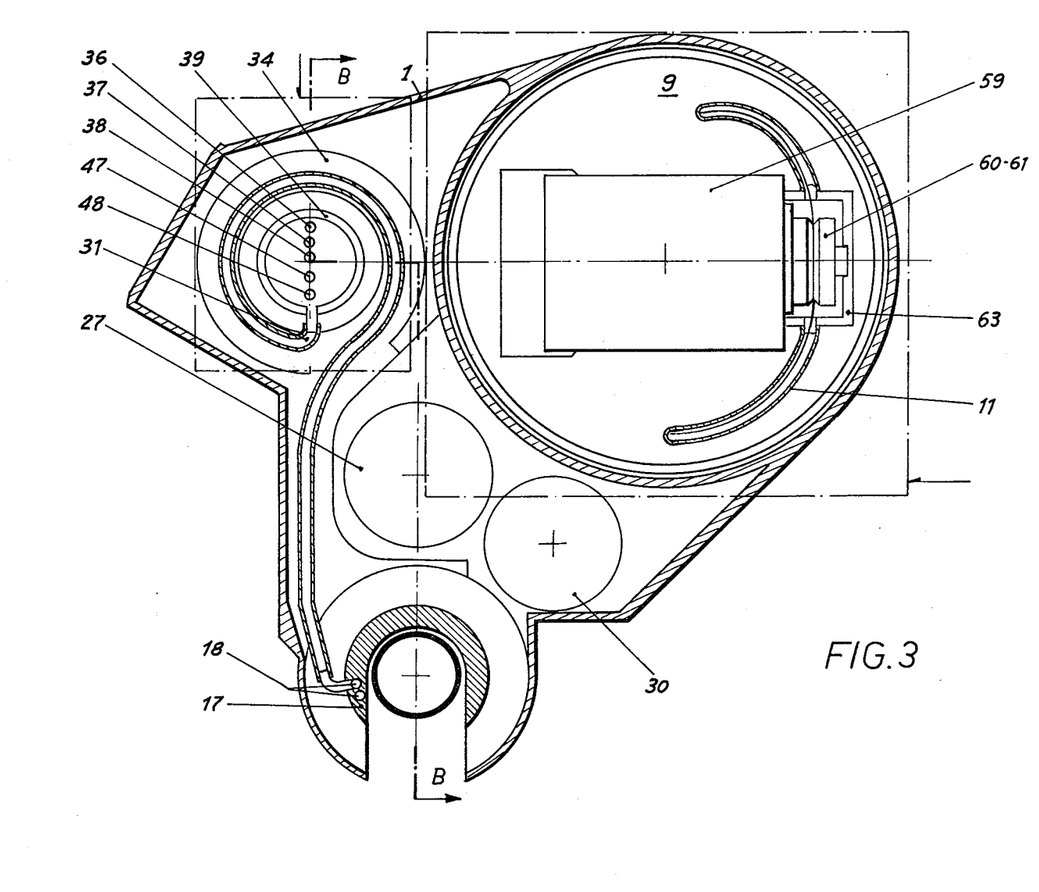
FIG. 3 shows a sectional view taken along the plane A-A of FIG. 2.
Figure 4:
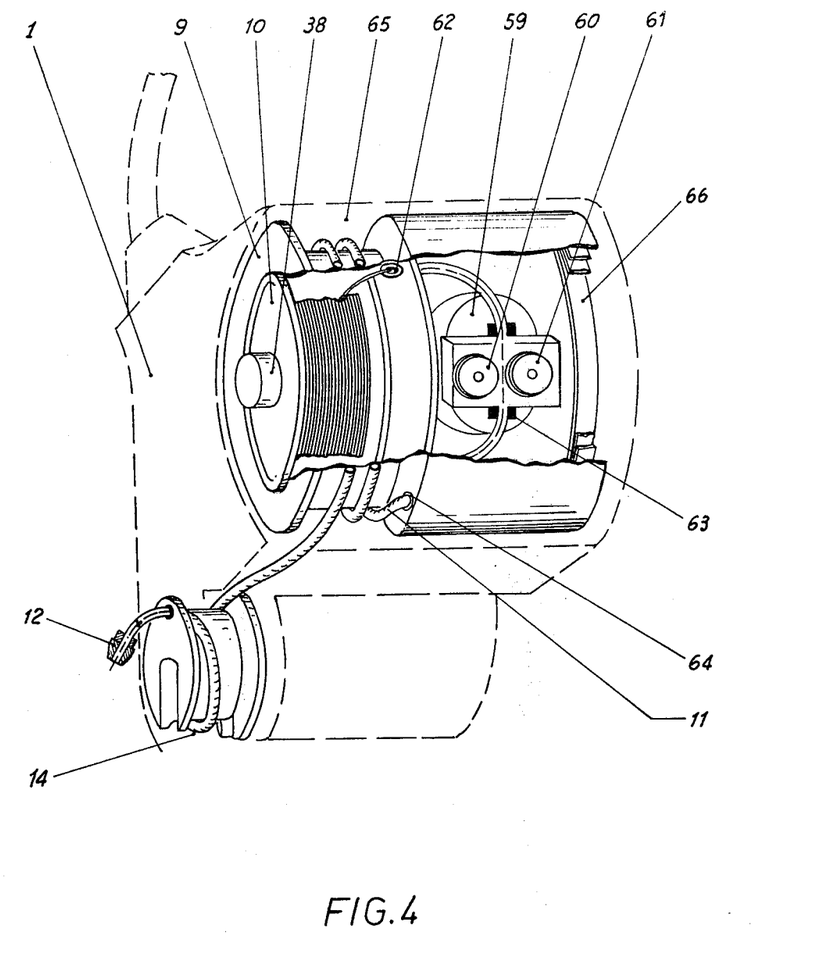
FIG. 4 shows in perspective view details of the feeding device for the weld wire.

Into the rotating drum 9 it will be inserted the coil of the weld metal wire 10, connected to the drum by a friction mechanism. Within the drum and rigid therewith, behind the coil as shown in FIGS. 3 and 4 is mounted a movement reducer 59 which through suitable grooved wheels 60-61 unwounds the wire, supplying through the sheath 11 (wound through two turns in the drum) the wire to the wire guide 12 located by side of the torch. During the revolution of the torch, the drum 9 is driven rotating by the sheath 11 the end of which is fixed to the wire guide 12 and which, unwinding from the drum, wounds in the groove 14 of the rotating body.

This winding has no hindering effect as, at the end of each operation, the torch will come again to its start point by a rearwards movement, leaving thus free the aperture for extracting the yoke.

The cooling fluid and the gas, reaching the yoke from the handle 15, are carried to the rotating body through flexible pipes which during the rotation wound in the groove 16 (as better shown in FIGS. 2 and 3) passing then through the inner part 17 of the rotating body 6 until reaching the torch 7.

Figure 2:
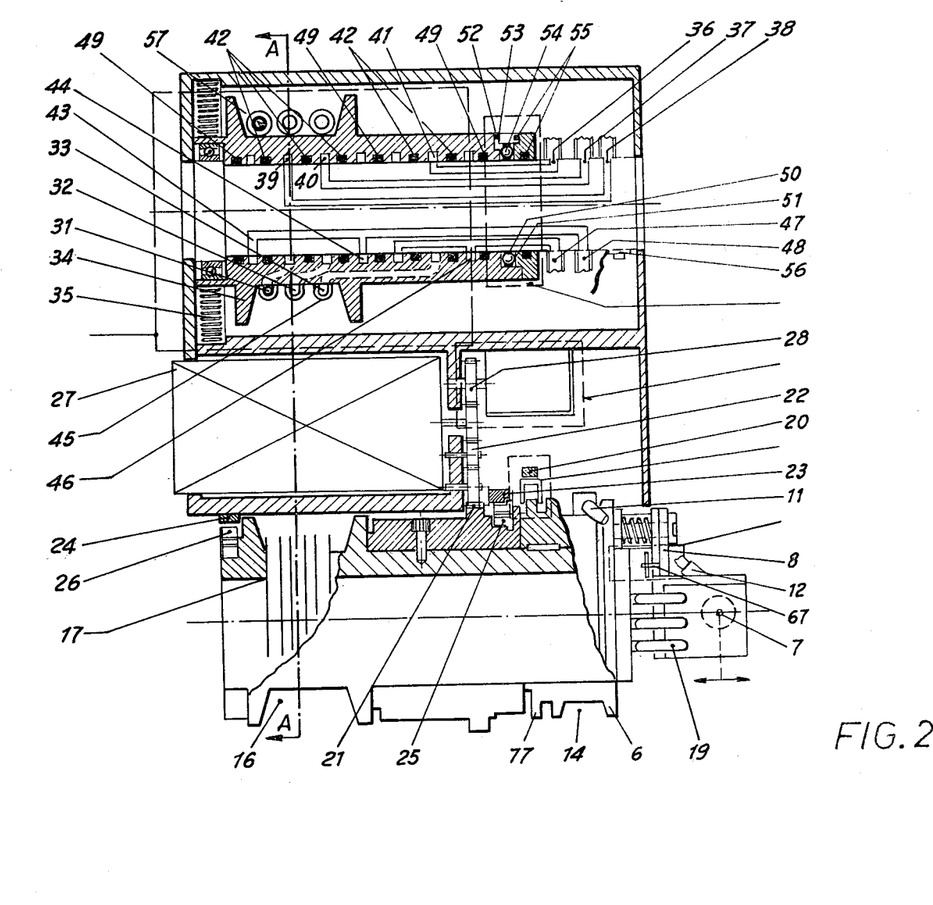
FIG. 2 shows a sectional view taken along the plane B-B of FIG. 3.

FIG. 2, showing a cross sectional view of the machine, shows: the groove 16 whereon wound the flexible pipes and cables for supplying the fluids and the electric power, the inner body 17 through which pass the ducts 18 (FIGS. 3 and 5a) which, continuing by the flexible members 19 reach the body of the torch 7.

The wire guide sheath 11 winding in the groove 14 before reaching the wire guide 12.

The flexible pipes 31, 32, 33 used for supplying the cooling fluid and the electric power, for the fluid return and for supplying the gas, respectively, to the rotating body, are wound on a winding drum 34; during the movement of the torch said flexible elements unwind from the drum, rotating it, and winding in the groove 16 of the rotating body.

Said flexible elements will be brought again to their starting position by the winder drum operated either by a coil spring 35 or by a motor.

The passage of the fluids from the stationary part (body of the yoke) to the rotating part (winding drum) is made by a rotary joint representing a substantial improvement with respect to the similar known joints.

The adoption of a rotary joint in the present machine allows the use of pipes outside the machine itself to be dispensed with, as said outer pipes could cause hindrances and possibility of damages to the pipes themselves. The joint used at present consists of concentrical cylindrical bodies, but the improvement can be adapted to different shapes, for instance faced discs.

The joint shown in FIG. 2 (group III) consists of two concentrical cylindrical bodies, the inner of which is stationary and receives the supplies from the handle 15 and through the ducts 36, 37, 38 carries said supplies to the recesses 39, 40, 41 formed in the rotary outer body. By side of each recess, the sealing elements 42 are located. Externally to these sealing rings further grooved recesses 43 and 44, 45 and 46 are formed, connected respectively by the ducts 47 and 48 to outside or to a negative pressure source. Further sealing elements 49 are located between these recesses, or between each recess and outside; the purpose of these recesses is of preventing two different fluids from mixing also in case of wear or of accidental break of a sealing element.

The transfer of the electric power from the stationary part to the rotary winding drum occurs through a rolling joint in amalgam bath (group I), (FIG. 2). The joint consists of a rolling race 50 obtained in the stationary part, and a rolling race 51 in the movable part; on these races a metal is applied which can be easily wetted by an amalgam which is introduced through the bore 52 into the recess 53 where between the two races are located the rolling bodies 54, namely balls, rollers or cones. Also other shapes, such as discs, or faced cones can be adopted, independently from the part which is considered stationary or movable. The amalgam serves the functions of lubricating the rolling bodies and of increasing the contact surface utilized for the transfer of the electric power which is effected mostly through the rolling bodies.

The amalgam is held by means of the sealing elements 55 and 49.

The power is supplied to the stationary part of the joint, insulated with respect to the casing, through the terminal 56 and from the rotary part of the joint, rigid with the winding drum 34 is transferred to the rotating body 17 and 6 acting as a support of the torch, by means of a copper braid 57 inside the supply pipe 31 for the cooling fluid. This joint which serves the simultaneous functions of power transfer means and of mechanical support (in the particular case it is the centering support for the above described fluid transferring joint) has the advantage of a low electric resistance as the power transfer occurs mostly through the rolling elements, and of eliminating the "interfaces" between the amalgam and races, where the accumulation of slags which can originate sparkles and micro-explosions with the consequent damaging of the parts, can occur.

Figure 5A:
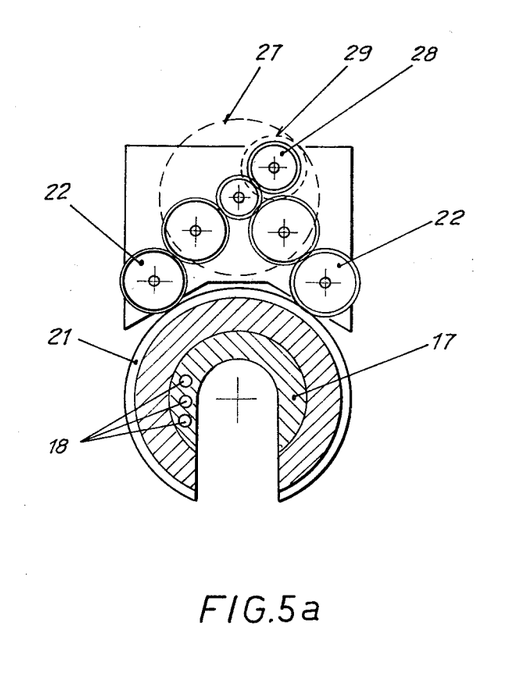
FIG. 5a shows a detail of the driving mechanism for the orbital movement.
Figure 5B:
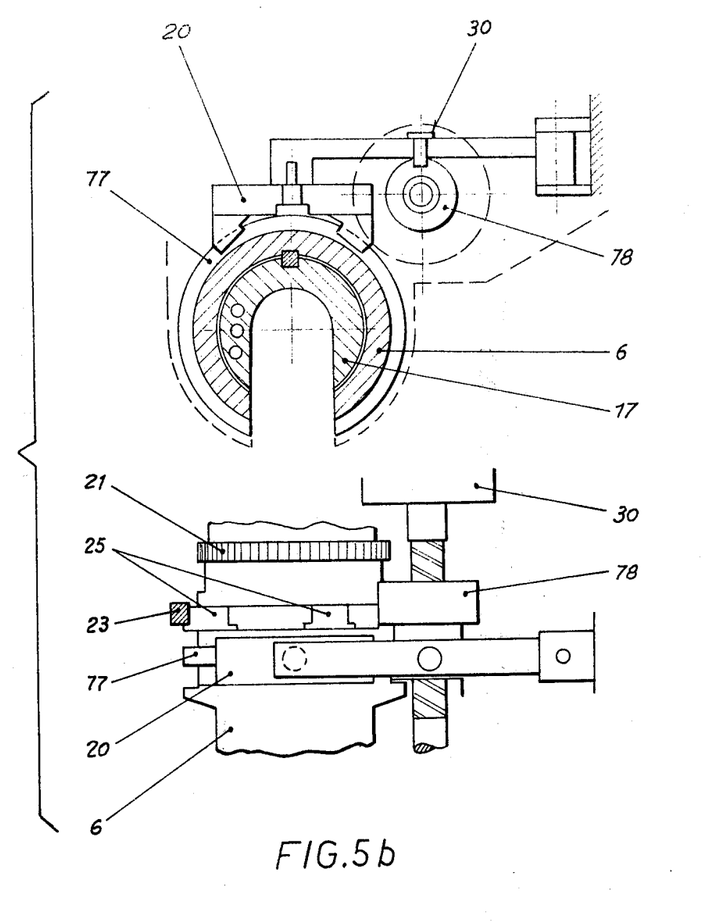
FIGS. 5b and 5c show details of the mechanism for imparting a to-and-fro movement to the welding torch.
Figure 5C:
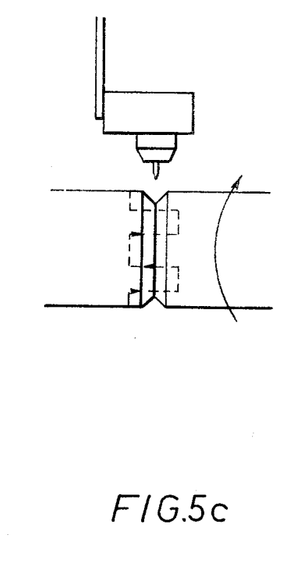

The to-and-fro movement of the torch, the mechanism of which is shown more in detail in FIG. 5b, i.e. the cross-wise movement with respect to the feeding movement (as shown by the arrows of FIG. 5c) is obtained by causing the body 6 to axially slide on the body 17 by means of the double fork 20 operated by the motor 30 (visible in FIG. 3) through a ball circulation spiral element 78 acting on the abutment 77 provided on the body 6. Alternatively, in certain cases a torch axially rigid with the machine may be preferred, but the entire unit can slide by a reciprocating movement on two or more guides (87-88) which formly connect to each other the clamping vises 2-3.

The operation of this direct current motor can be programmed by the control unit with a: "forwards-stop-rearwards-stop" cycle with times different both in total and from one another, in order to obtain the to-and-fro movement about a central position with different speeds and also in an asymmetrical way: this can be particularly useful when pipes are welded with different thicknesses. Further, the central position can be changed within a certain interval: this allows a pecision positioning to be obtained for the torch, after the yoke has been tightened on the pipes.

The rotary body 6, 17 is operated by a gear ring 21 (see also FIG. 5a) driven by a pair of planet wheels 22, so arranged that one at least will be always in mesh, and guided on rails 23, 24 by two sets of rollers 25, 26.

The pinion of the main motor reducer 27 drives, besides the members 22 also the gear 28 coupled to the device for controlling the speed and the position of the torch.

In fact the operation of an orbital welding machine is subjected to the control of a control unit requiring with continuity information about the orbital position of the torch and its speed of rotation, in order to adjust the variable values occurring during a working cycle. These variable values can be numerous but are strictly correlated to the position and the speed of rotation of the torch through its orbital path through a working cycle.

At present it is provided of coupling a precision potentiometer to the gearing controlling the orbital movement of the torch, in order to obtain a voltage which is function of the position of the torch at each instant, from said voltage being it possible to obtain signals representative of the angular position of the torch and of its speed of rotation. It will be thus possible to program, in function of the position of the torch, through a revolution or through more angular sectors, all welding parameters, such as for instance: intensity, current, distance from the electrode to the piece, speed of the wire of welding material, to-and-fro movement of the torch.

Figure 6:
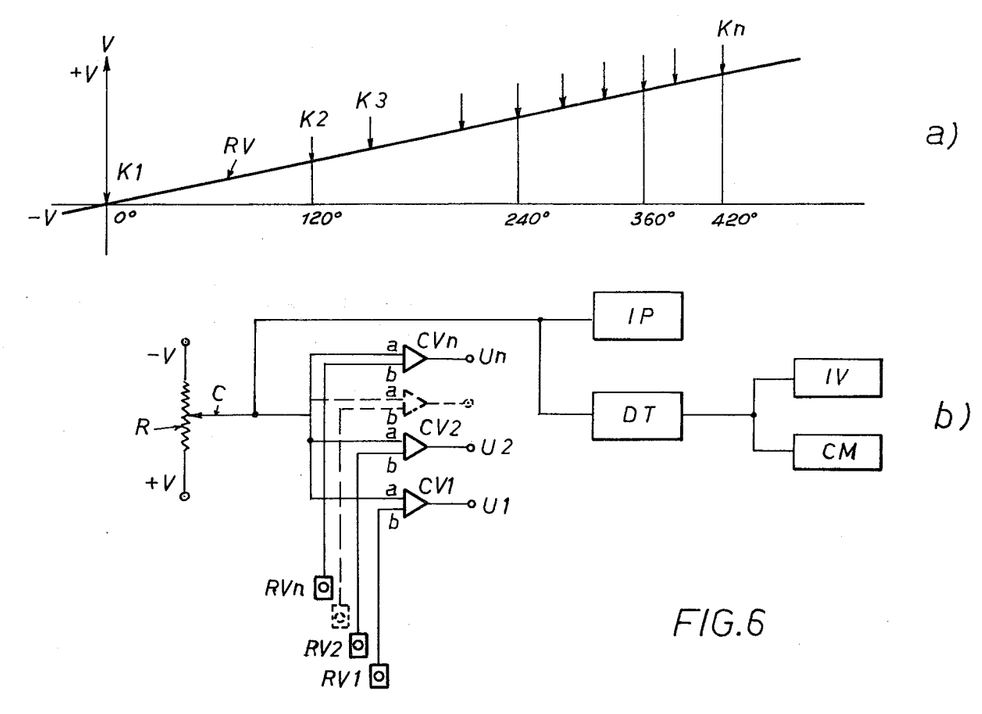
FIGS. 6a and 6b diagrammatically show a diagram for controlling the orbital position of the torch and a possible electronic circuitry for the control thereof.

This disclosure continues with reference to the drawings as follows; wherein:

FIGS. 2 and 5a show the mechanical arrangement for coupling a precision potentiometer to the mechanical members of the machine for orbital welding;

FIG. 6b shows a block diagram of the circuits for processing the signals concerned with the speed and the position of the torch;

FIG. 6a shows a diagram exemplifying the operation of the device according to the present invention.

With reference to FIGS. 2 and 5a, the gear 28 is connected to the shaft driving a precision potentiometer 29.

During the rotational movement of the pinion of the motor reducer 27 and thus of the rotating part of the machine, supporting the welding torch it is possible to obtain a voltage ramp, strictly related to the angular position of the torch 7, as far as the absolute value of the voltage is concerned, and with a slope strictly related to the speed of rotation of the torch through the orbit.

It will be thus possible by means of electric or electronic devices, located in the control unit:

(a) in function of the voltage present on the slider of the potentiometer, to program various work cycles, opening or closing sequentially the switches controlling the various welding parameters (feeding of the wire, intensity of the welding current, to-and-fro movement, etc.);

(b) in function of the derivative with respect to time of said voltage, to obtain a speed signal useful, for instance as a feedback signal for controlling the speed of rotation of the motor-reducer 27.

With reference to FIG. 6b, the potentiometer 29 has a resistor R and a slider C mechanically connected to the shaft of the potentiometer. Accordingly, it will be available a voltage variable at least between $-V$ and $+V$ in function of the angular position of the welding head 7.

The trend of this voltage is shown in the FIG. 6a by the straight line RV in the chart showing in the abscissae the degrees of rotation of the head 7.

The voltage available on the slider of the potentiometer 29 is applied to the inputs a of the voltage comparators $CV_1, CV_2 \ldots CV_n$, to the inputs b of which are applied the reference voltages supplied by the reference voltage generators $RV_1, RV_2 \ldots RV_n$, the voltage of which will be pre-established when the machine will be prepared, in a way known to a person skilled in the art, so that it is deemed unnecessary to describe it in detail.

When the thresholds established by the reference voltage generators $RV_1, RV_2, \ldots RV_n$ will be overpassed, there will be corresponding switchings in the comparators $CV_1, CV_2, CV_n$ and a relative output signal will appear at the outputs $U_1, U_2, \ldots U_n$, and in correspondence with the relative "break points" $K_1, K_2, \ldots K_n$ shown on the straight line RV of the chart of FIG. 6a.

The signal, coming from the slider C is also carried to a position indicator IP which shows at each instant the position of the head 7 in its orbital path.

The signal coming from the slider C is also carried to a derivator with respect to time, which effects the operation dV/dt and drives both a speed indicator IV and the control circuits CM for the speed of rotation of the motor reducer 27.

The solution according to the present invention proves to be advantageous with respect to the known solutions which made use of a cam controlled microswitch or magnetically operated contacts.

In fact the last cited contacts cannot supply a continuous signal showing at each instant the angular position of the torch. Furthermore, by the arrangement according to this invention, it is possible to dispense with a tachometric generator coupled to the operating motor for controlling its speed of rotation.

The weld metal supply system (group VI) is shown partially sectioned in FIG. 3, and in perspective view for the interesting parts, in FIG. 4. With reference to these two figures, where the numeral reference 1 denotes the stationary frame of the yoke, the rotary drum 9 contains a spool of wire 10, held in position by the ring nut 58, but free of rotating, by a friction mechanism, with respect to the drum. In the rear part of the drum, a motor reducer is mounted, operating two grooved wheels 60, 61, contrasting against one another elastically.

The weld wire, unwinding from the spool through the bore 62 reaches the grooved wheels 60, 61 whereby it will be pushed into the wire carrying sheath 11. This sheath fixed to the support 63 of the grooved wheels issues from a bore 64 on the outer part of the drum and makes about two turns in the groove 65.

From this groove, the sheath reaches the groove 14 on the rotary body 6 supporting the torch and from this groove it reaches the wire guide 12 rigid with the torch, where the sheath is fixed.

When the torch revolutes about the pipe in order to carry out the weld, the wire carrying sheath within which the wire slides, acts as a driving member for the drum, which is idle on a shaft.

During the return movement of the torch to its start position, by means of either the coil spring 66, or mechanisms operated by a motor, the drum will be carried back to its start position causing the sheath to be wound again in the groove 65. The main advantage of this system for supplying the wire consists in having, for each position of the torch, the same length of the wire between the wire pushing grooved wheels, and the wire guide, avoiding thus the possible variations of the wire supply. Further the wire will be entirely electrically insulated from the other parts of the machine.

Figure 7A:
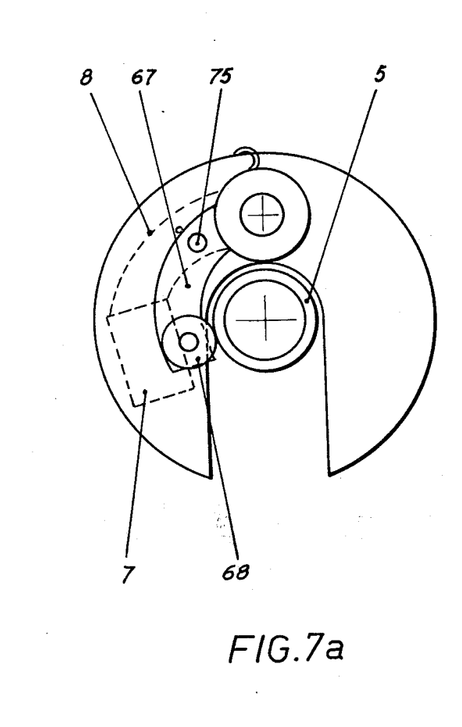
FIGS. 7a and 7b show in front elevation and in side elevation; respectively, one first embodiment of a feeler of mechanical type for keeping constant the distance between the torch and the piece.
Figure 7B:
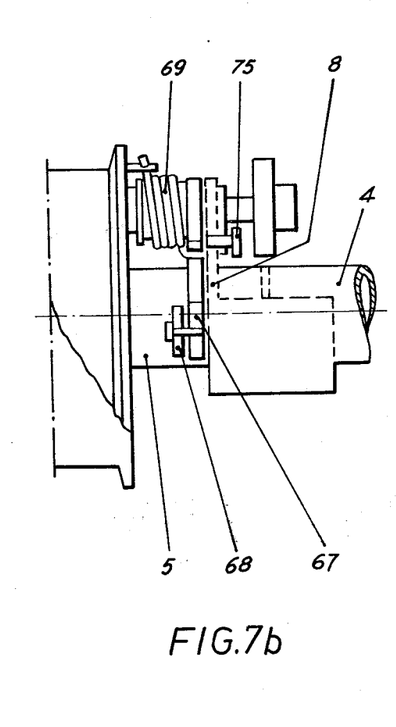
Figure 7C:
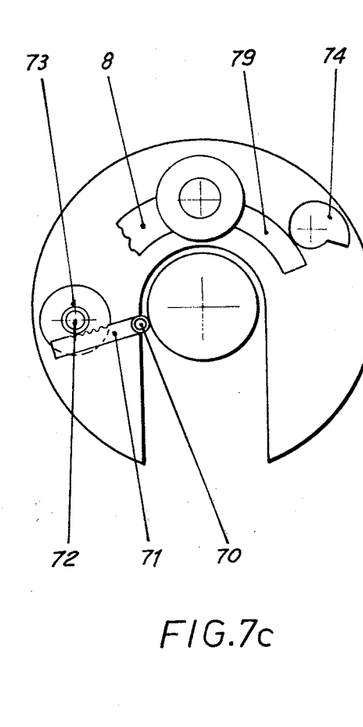
FIG. 7c shows an interlocking variation of the feeler as shown in the FIGS. 7a and 7b.

The device for maintaining the distance of the torch from the piece to be welded (group IV) is illustrated in FIG. 7, where two solutions are shown as adopted in relation to the welding needs.

In FIG. 7a and 7b a mechanical type feeler is shown consisting of an arm 67 rigid with the oscillating support 8 for the torch 7 (shown in dotted line in the figure) to which a contact element 68 is fixed contacting the surface of the pipe to be welded 5; in this case each shape defect of the pipe and its possible eccentricity will be transmitted to the torch which will move away maintaining thus the pre-selected distance, nearing then again upon the action of the spring 69. Of course the mutual position of the contact element and of the torch will be so adjusted as to pre-fix the suitable distance; the screw 75 serves to lock the unit in this position.

The FIG. 7c shows an interlocking system for adjusting the distance of the torch, by the detection of the distance obtained by a feeler which transmits the related signal to the control unit. This unit after processing and comparison with the distance pre-fixed by the operator will send a control signal to a member which by means of a mechanical linkage will operate the movement of the torch.

In order to detect the distance, in FIG. 7c for simplicity has been shown a system with a contact element acting on the resistor of a precision potentiometer, but systems based on the variations of other physical values can be adopted, such as for instance either the magnetic induction, or the capacitance, using or not the contact element or utilizing the variation of the arc voltage or the reflection or electromagnetic or sound waves.

In the figure the contact element 70 operates by means of a rack 71 and a gear 72, the shaft of the slider of a precision potentiometer 73 the output signal of which, consisting in a variation of voltage, is sent to the control unit in an entirely analogous way as described for detecting the position of the torch.

In this unit, the detected voltage is compared with a reference voltage selected by the operator and corresponding to a pre-selected distance of the torch from the piece to be welded. A possible difference (plus or minus), will be transformed into an error signal which will be sent to a motor member which through suitable mechanisms will operate the cam 74. This can through the lever arm 79, rigid with the oscillating support 8 of the torch, will bring again the distance to the selected value.

The mechanisms for operating the support of the torch can be different and consist in endless screws, conical eccentrics or other devices according to the solution adopted for the motor member which could be rigid with the rotary body or fixed inside the casing of the machine.

The quick locking self centering vises, denoted by 2 and 3 in FIG. 1, have a particular importance as they allow an easy introduction and clamping of the yoke on the pipes to be welded, an alignment thereof and their centering with respect to the rotating body of the yoke also when the diameter changes within a certain interval.

Figures 8A, 8B, 8C:
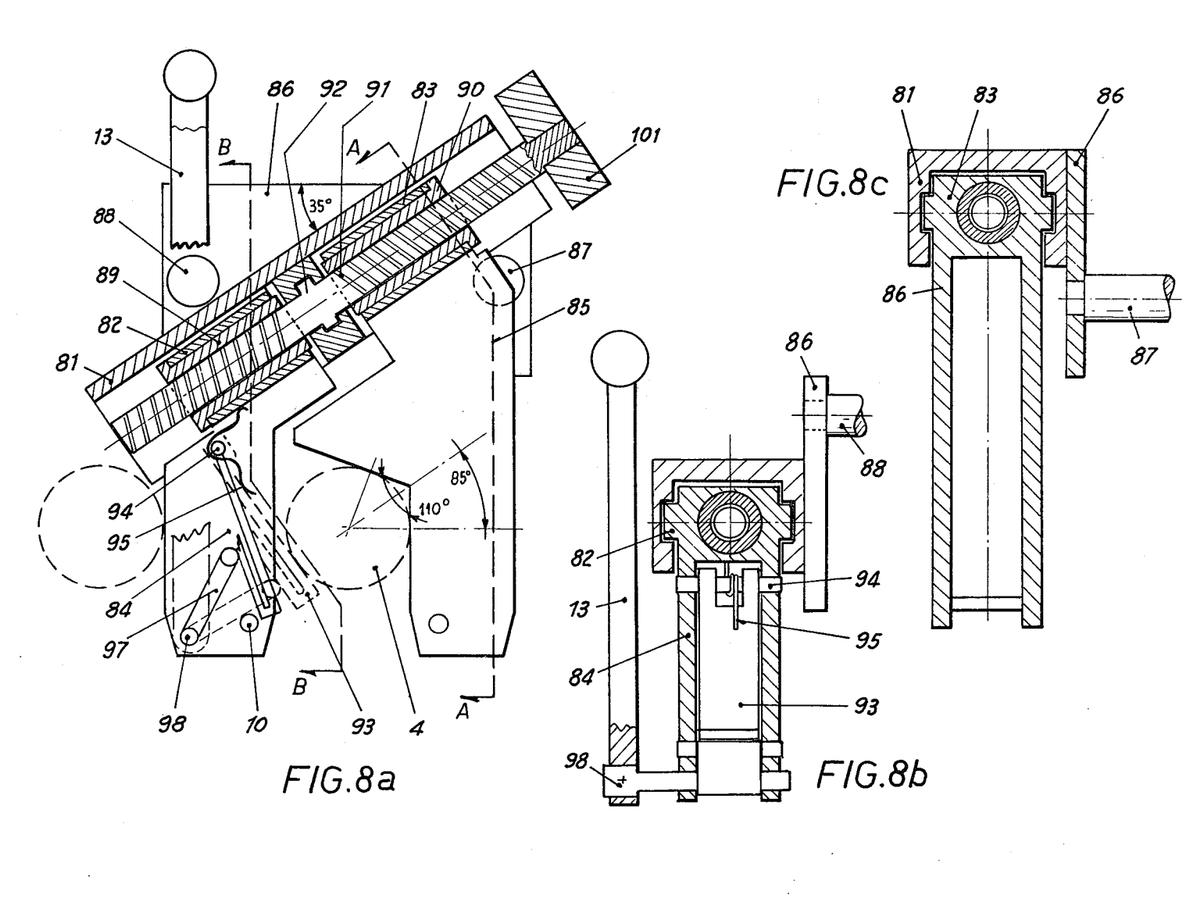
FIGS. 8a, 8b, and 8c show details of a type of self-centering clamping vises for locking the yoke on the pipes to be welded.

Said vise consists as shown in FIG. 8a, of a guide 81 within which slide two slide members 82 and 83 supporting the jaws of the vise 84 and 85.

The guide is mounted with a 35° angle on a support 86 in turn fixed by the rods 87 and 88 to the body of the machine.

The two slide members 82 and 83 can be spaced apart or neared so as to open the jaws to the desired diameter, by acting on the ring nut 101 rigid with the screw 91, consisting of a part with a left hand thread and a part with a right hand thread, with pitches having the ratios 1.25 to 1.5, held positioned by a central bush 92, and which engages the bushes 89 and 90 formed on the slide members.

The jaw 85 forming the rigid abutment has a V shape with a 110° angle.

The jaw 84 supports the movable member of the yoke consisting of a tab 93 pivoted on the pin 94, held in "open" position by a spring 95.

Said movable member will be forward pushed to clamp the pipe 4 (position in dotted line) by an arm 97 pivoted in 98 and rigid with the tightening lever 13.

The pivot 100 forms the end-of-stroke stop member of the arm 97 in "knee" position i.e. beyond the line connecting the pivot 98 to the centre of the pipe 4; this stable position can be reached thanks to the elasticity due to the particular shape of the movable element, this shape forming an important element of the present invention.

The elasticity of the movable element allows the tightening to be obtained on pipes the dimensions of which are slightly different within the manufacturing tollerances.

Anyway, the pin 100 serves also the function of stop member for the aperture of the movable abutments so as to prevent pipes having a too large diameter with respect to the aperture of the jaws from being introduced, and such as to require a tightening stress having such a value as to deform the elastic part of the movable abutment itself.

Having thus described the present invention, what is claimed is:

1. A machine for automatically welding abutting pipe pieces, of the type having a control unit for programming the weld parameters such as welding torch current intensity and revolution speed, the amount of applied weld material and to-and-fro movement of the torch according to cycles suitable to the different types of welds, a stationary body which can be tightened on the pipes to be welded, and a welding torch capable of forming a weld bead and performing a multiplicity of revolutions about the pieces to be welded about a welding zone, said machine comprising: means for tightening said machine on the ends of the pipes to be welded, including a stationary element fixed to the machine, and an element movable axially and radially with respect to the stationary element; a welding torch carried by said movable element; means for positioning the welding torch with respect to the ends of the pipes to be welded; means for rotating said movable element in a controlled manner with respect to the ends of the pipes to be welded; means for moving said movable element and said torch perpendicularly to the weld bead to establish the welding zone; means for controlling and adjusting the distance between said torch and the pipe pieces to be welded; means for transferring fluids from the stationary element to the movable element and said torch; means for supplying electric power from said stationary element to said torch; means for feeding weld metal in correspondence with the welding zone; and control means responsive to the rotational position of said moveable element and said torch for varying said welding parameters according to a programmed cycle, wherein said means for transferring fluids from said stationary element to said rotating element include a rotatable drum; a plurality of flexible pipes wound on said rotatable drum, said pipes interconnecting points of utilization on, and exhaust from, said torch and corresponding couplings on said drum; means for winding said pipes to a winding position on said drum; a cylindrical element; said drum being internally hollow and mounted rotatable concentrically with said cylindrical element; said drum being provided with fluid receiving and exhausting grooves, sealingly insulated from one another by means of sealing elastic O-rings, said grooves being connected with the couplings of said pipes; said cylindrical element being provided with ducts for supplying and for removing the fluids in correspondence with the corresponding fluid receiving and exhausting grooves of said drum; said grooves for the transfer of fluids being connected to a source of reduced pressure with respect to the fluids coming from said cylindrical element, for removing the fluids escaping from said transfer grooves.

2. A machine as claimed in claim 1, wherein said means for supplying the electric power from said stationary element to said torch include an electromechanical joint supporting said drum, said joint comprising two rolling races in an amalgam bath, the transfer of the electric power occurring by the simultaneous presence of said amalgam and said rolling races; sealing elements mounted between said two rolling races for holding the amalgam bath; a metal cladding associated with said two races; and means for wetting said cladding with the amalgam.

3. A machine as claimed in claim 2, wherein said means for controllably rotating said moveable element with respect to the edges of the pipes to be welded comprise a potentiometer having a slider; a precision voltage source feeding said potentiometer, the slider of which is mechanically connected to the linkage controlling the movement of said moveable element; the arrangement being such as for each angular position of said torch, at the slider of said potentiometer will be available a pre-fixed voltage; a multiplicity of voltage comparators; pre-adjustable voltage sources corresponding to various preestablished points of the rotational path of the torch connected to said comparators, said comparators being arranged so as to supply signals in coincidence with the torch passing through predetermined positions by means of said pre-adjustable voltage sources; a position indicator connected to said slider for showing the position at each instant of said torch; and a differentiating circuit also coupled to said idler for supplying in a known way a voltage signal proportional to the speed of rotation of said torch.

4. A machine as claimed in claim 3, wherein said means for tightening said machine on the ends of the pipes to be welded comprise a fixed abutment part having a V groove the size of which is proportional to the acceptable range of diameters of the pipes to be welded, and a moveable abutment, said stationary part being arranged so as to co-operate with said moveable abutment.

5. A machine as claimed in claim 4, wherein said means for positioning the welding torch with respect to the ends of the pipes to be welded comprise first means for precisely positioning said torch with respect to the ends to be welded after said machine has been clamped to the pipes and before the starting of the welding cycle; second means for imparting to-and-fro movement to said moveable element during the rotational movement of said torch said to- and-fro movement being perpendicular to the welding bead, said to-and-fro movement having frequency and amplitude which can be programmed by the control unit even in an asymmetric mode with respect to a central position; third means for detecting at every instant during the welding operation the distance from the torch to the pipe, consisting of a detecting element responsive to an electric value; and fourth means applied to the torch, for holding said torch at a pre-fixed distance with respect to the pipes to be welded.

6. A machine as claimed in claim 5, wherein said feeding means for the weld wire comprise a wire pushing device, means for independently powering said wire pushing device, a drum free to rotation and rotated by the support of the torch, said wire pushing device being within said drum so that the length of the wire between said wire pushing device and the torch will remain constant for each position of the torch itself, for providing a constant feeding; and a sheath made of insulating material within which slides the wire throughout its path so that said wire will be always electrically insulated with respect to the machine.

7. A machine for automatically welding abutting pipe pieces of the type having a control unit for programming the weld parameters such as welding torch current intensity and revolution speed, the amount of applied weld material and to-and-fro movement of the torch according to the cycles suitable to the different type of welds, stationary body which can be tightened on the pipes to be welded, and a welding torch capable of forming a weld bead and performing a multiplicity of revolutions about the pieces to be welded about a welding zone, comprising: means for tightening said machine on the ends of the pipes to be welded, including a stationary element fixed to the body of the machine, and an element movable axially and radially with respect to the stationary element; a welding torch mounted on said moveable element; means for positioning the welding torch with respect to the ends of the pipes to be welded; means for rotating said moveable element in a controlled manner with respect to the ends of the pipes to be welded; means for imparting a to-and-fro movement to said movable element and said torch perpendicularly to the weld bead to establish the welding zone; means for controlling and adjusting the distance between said torch and the pipe pieces to be welded; means for transferring fluids from the stationary element to the moveable element and said torch; means for supplying electric power from said stationary element to said torch; and means for feeding weld material in correspondence with the welding zone; said means for transferring fluids from said stationary element to said rotating element including a rotatable drum, a plurality of flexible pipes wound on said rotatable drum, said pipes interconnecting points of utilization on, and exhaust from, said troch and corresponding couplings on said drum, means for winding said pipes to a winding position on said drum, a cylindrical element, said drum being internally hollow and mounted rotatable concentrally with said cylindrical element, said drum being provided with fluid receiving and exhausting grooves, sealingly insulated from one another by means of sealing elastic O-rings, said grooves being connected with the couplings of said pipes, said cylindrical elements being provided with ducts for supplying and for removing the fluids in correspondence with the corresponding fluid receiving and exhausting grooves of said drum, said grooves for the transfer of fluids being connected to a source of reduced pressure with respect to the fluids coming from said cylinder, for removing the fluids escaping from said transfer grooves.

* * * * *

UNITED STATES PATENT AND TRADEMARK OFFICE
CERTIFICATE OF CORRECTION

PATENT NO. : 4,168,406
DATED : September 18, 1979
INVENTOR(S) : Roberto Torrani

It is certified that error appears in the above-identified patent and that said Letters Patent are hereby corrected as shown below:

Column 1, line 9 change "hereby" to --Thereby--;

Column 2, line 6 change "chance" to --change--;

Column 2, line 59 change "(group II)" to --(group III)--;

Column 4, line 62 change "formly" to --firmly--;

Column 7, line 43 change "or" to --of--;

Column 7, line 56 change "can" to --cam--;

Column 9, line 60 change "idler" to --slider--;

Column 10, line 66 change "troch" to --torch--.

Signed and Sealed this

Twenty-ninth Day of January 1980

[SEAL]

Attest:

SIDNEY A. DIAMOND

Attesting Officer

Commissioner of Patents and Trademarks